United States Patent [19]
Föhl

[11] 4,327,881
[45] May 4, 1982

[54] BELT-BRAKING DEVICE FOR SAFETY BELT SYSTEMS

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 199,329

[22] Filed: Oct. 21, 1980

[30] Foreign Application Priority Data

Oct. 26, 1979 [DE] Fed. Rep. of Germany ....... 2943441

[51] Int. Cl.³ .................... A62B 35/02; A65H 75/48
[52] U.S. Cl. ................................. 242/107.2; 280/806
[58] Field of Search .......... 242/107.2, 107.3, 107.4 R, 242/107.4 E, 75.2; 280/801–808; 297/474–480

[56] References Cited

U.S. PATENT DOCUMENTS

| 2,970,787 | 2/1961 | Libby | 242/75.2 |
| 3,664,598 | 5/1972 | Sherman | 242/107.3 |
| 3,817,473 | 6/1974 | Board et al. | 242/107.2 |
| 3,871,599 | 3/1975 | Takada | 242/107.2 |
| 4,249,708 | 2/1981 | Asano | 242/107.4 A X |

FOREIGN PATENT DOCUMENTS 2355358  5/1975  Fed. Rep. of Germany ... 242/107.2

Primary Examiner—John M. Jillions
Attorney, Agent, or Firm—Herbert L. Lerner; Laurence A. Greenberg

[57] ABSTRACT

Belt-braking system for safety belts having the known automatic roll-up device with a locking device followed by a belt brake. The belt-brake has a rotatably supported brake roller which is partly wrapped around by the belt. Friction or positive locking means arrest the brake roller when activated by a belt pull which exceeds a predetermined force.

25 Claims, 17 Drawing Figures

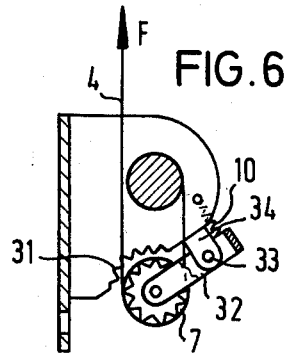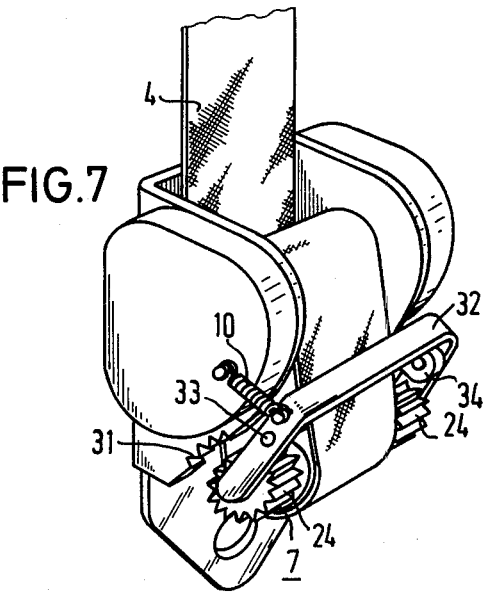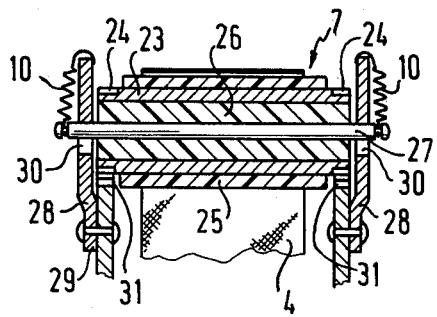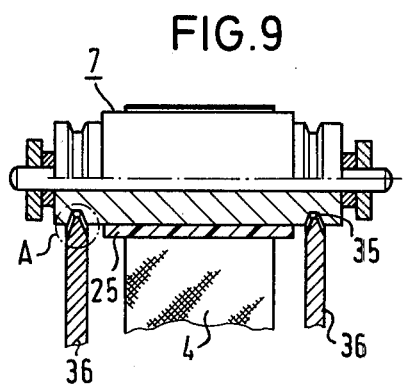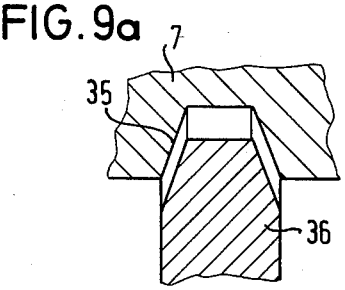

BELT-BRAKING DEVICE FOR SAFETY BELT SYSTEMS

BACKGROUND OF THE INVENTION

1. Field of the Invention

The invention relates to a belt-braking device for safety belt systems, especially for motor vehicles, and more particularly refers to a new and improved safety belt system in which a belt-brake which is activated by the belt pull, is arranged after an automatic locking device, and serves to eliminate the film-spool effect at the belt lock roller of the automatic device.

2. Description of the Prior Art

In safety belt systems, after the locking of the belt in an automatic roll-up device, there are approximately 50 to 100 mm of belt band which can still be pulled out ffrom the belt portion rolled up in the automatic roll-up device, due to a film-spool effect at the roller. By sequentially arranging a holding device which arrests the belt after a short path, that is, almost immediately, this undesired film-spool effect is avoided.

There are devices known provided with such belt braking provisions, in which, when the belt brake is activated, the belt band is mechanically pressed between suitably shaped clamping jaws and thereby prevented from being pulled out any further. During this clamping, the fabric of the belt is strongly squeezed in small local areas and thereby damaged, so that the belt is unable with the required safety factor to accept the forces imposed by a crash. This unreliability factor is further aggravated by the fact that this clamping action occurs not only at an accident, but also during sharp braking when the belt brake is activated and moves into the clamping position. Severe damage to the belt results from the repeated clamping actions during its normal lifetime. The danger exists under these conditions that the belt will break in the case of an accident, a fact proven by suitable experiments. Therefore, in practice, these known belt-braking devices were not used.

SUMMARY OF THE INVENTION

An object of the instant invention is to provide a safety belt system of the above type which will not damage the belt when it is arrested during both the sudden and strong belt braking phase, such as an accident, and also during repeated and extreme stopping actions such as sharp braking.

With the foregoing and other objects in view, there is provided in accordance with the invention, a belt-braking system for safety belts, especially for motor vehicles, which comprises an automatic roll-up device having a roll-up roller on which a safety belt is wound and which is normally unwound by pulling the belt against the force of a spring, said roll-up device having a locking device which is activated to lock the roll-up roller when the vehicle accelerates or decelerates beyond a predetermined rate, a belt-brake having a rotatable supported brake roller which is partly wrapped around by said belt from said automatic roll-up device, friction or positive locking means to arrest said brake roller, and activating means activated by a belt pull when it exceeds a predetermined force, to cause said locking means to arrest said roller.

Although the invention is illustrated and described herein as embodied in a belt-braking device for safety belt systems, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which:

FIG. 6 diagrammatically illustrates a sectional side view of a further embodiment of the safety belt system according to the invention, with the roller in a swinging support;

FIG. 7 is a perspective representation of the safety belt system of FIG. 6;

FIG. 8 is a sectional view of a further embodiment of the safety belt system showing particularly the brake roller as a tubular sleeve with a non-skid elastic layer, and also showing the roller by means of a shaft supported in the walls of a bracket;

FIG. 9 is a partial section of a belt-braking device of the wedge-brake type;

FIG. 9a is an enlarged detail of the wedge-brake shown in FIG. 9;

DETAILED DESCRIPTION OF THE INVENTION

The belt brake is provided with a rotatably supported brake roller which is partly wrapped around by the belt. The brake roller can be arrested by a friction- or positive lock, when activated. By blocking of the locking system in the automatic locking device, and by the loading of the belt, an increased belt-pulling force is generated. This force exceeds the activating threshold, for example, a spring force, a counter weight or a shear-force (shear pin) and thus causes the roller to be blocked. A band-braking effect is generated immediately by the wrap-around angle of the belt band, which results in braking and arresting the belt according to the function $\rho^{\mu\alpha}$. If one chooses a friction pair between the belt and the running surface of the roller, which leads to self-locking at a certain wrap-around angle $\alpha$, the belt will automatically brake according to the system of the band brake. By this arrangement, a high resistance against further pull-out of the belt is achieved in the most natural and least damaging way, without the belt squashing and extreme high surface wear, as is the case in the known systems. If the load is taken from the belt system, the device returns automatically to its normal position, for example, by the force of a spring, and thereby the full freely rolling condition is re-established for the normal use of the belt system. Also at repeated, extreme braking actions there is no wear to the belt fabric which could reduce the strength and stability of the belt.

According to a further development to the invention, the brake roller is movable relative to a counter support, and the brake roller is prevented from continued rotation by contact of at least one of its end regions with one or more counter-supports by friction- or positive locking. The brake roller, or several rollers, may be supported rotatably on a rocker arm, which is normally kept in the de-coupled position with respect to the counter support by a spring. Alternatively, the roller may be rotatably supported on an axis shaft in a bracket or housing, and can be arrested by clamping-locks acting from outside or inside, band brake locks, or by means of locking teeth. Further advantageous details of the invention are shown in the schematic drawings, and will be explained in the following described embodiments.

Figure 1:
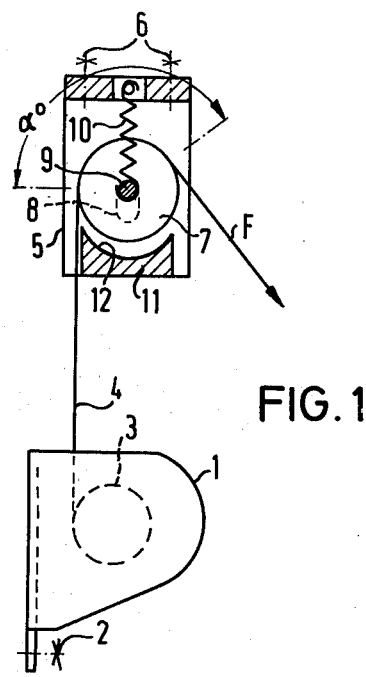
FIG. 1 diagrammatically illustrates a typical embodiment of the safety belt system of the invention in which an automatic roll-up device precedes a belt-braking device, with a roller as belt brake, and a braking pad. A pull on the belt which exceeds a predetermined force as set by a spring, causes the belt roller to move into contact with the braking pad.

The belt-braking device according to FIG. 1 is arranged before a conventional automatic roll-up device with locking device 1, which is fastened at securing positions 2, for example, at the frame of a motor vehicle, and carries a wind-up roller 3 on which the belt 4 is rolled up. This wind-up roller 3, in known manner, is automatically locked by known locking means, at the occurrence of predetermined accelerated or decelerated motions, for example, in the case of a crash. Without the presence of a following belt-braking device, when this locking device is activated, an additional short belt portion is pulled from the wind-up roller because of the known film-spool effect when the belt is pulled. This effect is prevented by the belt-braking device. For this purpose a brake roller 7 is provided in a bracket or housing 5, which can also be connected at the securing places 6, for example to the vehicle frame. The roller 7 is slideably supported in a short slotted guide 8 in such manner that the roller can rotate freely, and unobstructedly. In the position shown in FIG. 1, the roller 7 and its axis shaft 9, is held at the upper end of the slot by a spring 10 which is secured at the bracket 5. The belt 4 is partly wrapped around this roller 7 with a belt contact angle $\alpha$. A braking pad 11 is connected to the bracket 5, and provided with a braking surface 12 which has a curve corresponding to the radius of the roller 7. At the normal in- and out rolling of the belt 4, i.e. at the normal use of the safety belt, the roller 7 is held in the shown rest position by the spring 10, and is freely rotatable. Only after exceeding a predetermined threshold value, i.e. an activating threshold is the force of spring 10 overcome, and the roller 7 comes in strong contact with the braking surface 12. As a result, the roller 7 is automatically braked by the effect of the belt-force F, and thereby arrested. The angle $\alpha$ shows the wrap-around angle in which the belt braking effect is acting. A further pulling-out of the belt 4 from the belt roller 3 is thereby reliably prevented.

Figure 2:
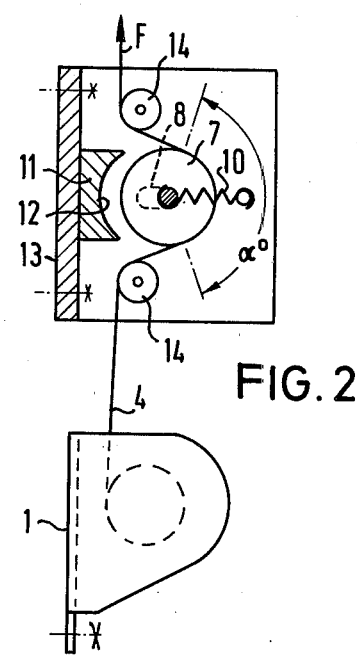
FIG. 2 is a variant of FIG. 1 and has an arrangement of deflection rollers which permit the belt to exit from the belt-braking device in the same direction it leaves the automatic roll-up device.

In the embodiment according to FIG. 2, there is also a belt braking device arranged directly after an automatic roll-up device 1. The belt braking means comprise a fitting 13, a braking pad 11, a roller 7 which is guided in a slot 8, a spring 10, and two deflection rollers 14. By the suitable arrangement of the deflection rollers 14, a corresponding wrap-around angle $\alpha$ is also effected here, but in contrast to FIG. 1, the belt 4 is continued in the same direction. Here also the roller 7 is pressed against the braking surface 12 of the braking pad 11 after overcoming a predetermined activating threshold by the belt force F, and the roller 7 thereby arrested. In all the previously- and later described embodiments of similar construction it is provided that a matched friction pairing exists between the roller 7 and the belt 4, which results in self-locking, according to the wrap-around angle $\alpha$, corresponding to the $\rho^{\mu\alpha}$-effect when the roller 7 is arrested. The friction ratio can be advantageously influenced by suitable profiling, for example, by roughening the contact surface of the roller 7.

Figure 3:
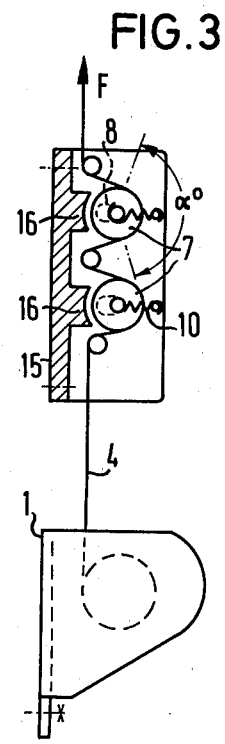
FIGS. 3, 4 and 5 illustrate three different embodiments of the invention in which each belt-braking device has two rollers acting as the belt brake and two braking pads.

In the embodiment according to FIG. 3, there is again a belt braking device, spatially separated, after the automatic roll-up device 1. Two braking pads 16 are arranged on top of each other in a bracket 16 with associated rollers 7 guided in slots 8, which rollers are again held in the rest position by springs 10. This embodiment is a further development of the device according to FIG. 2, whereby greater force transfer is achieved by wrapping the belt around two rollers 7, because the large belt brake friction moment is effective twice. Here, also the belt pull-out occurs in a single direction, whereby, when activated, i.e. in case of a crash, both rollers 7 are moved to the braking- or arresting position.

Figure 4:
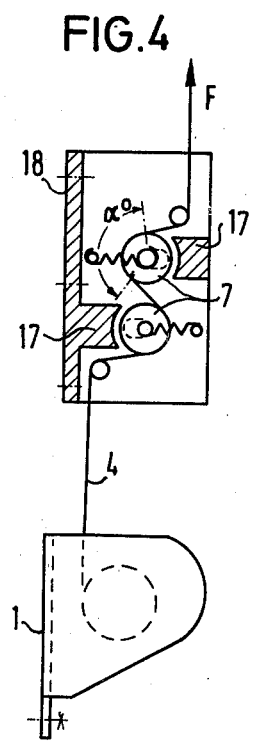

In contrast thereto, in the embodiment according to FIG. 4, the rollers 7, which are also guided in slots and tensioned by springs, are moved in opposite directions by the alternate wrap-around of the belt 4, and arrested at the braking pads 17, which are also disposed at opposite sides of the bracket 18.

Figure 5:
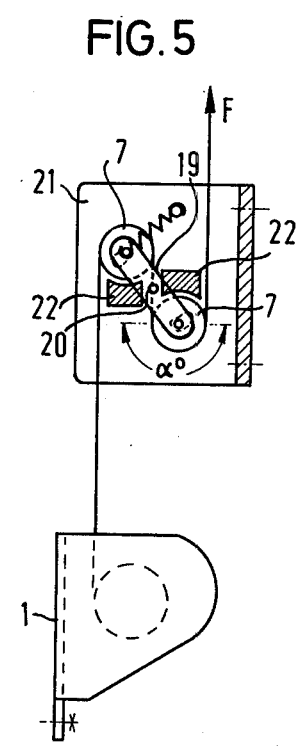

FIG. 5 shows a preferred embodiment. Here two rollers 7 are supported on both ends of a rocking arm 19, which rocking arm 19 is freely hingeably supported at the central hinge axis at 20 in the bracket 21. The rollers 7 are again associated with braking pads 22 which are arranged on opposite sides, By this arrangement a system results which is in all directions, statically as well as dynamically balanced, a very important feature for use in vehicles. When the belt in the roll-up device 1 is blocked, and the belt system is under load, the pair of rollers 7 is tilted, and comes to a clamp or engagement position, so that both rollers 7 are arrested against rotation.

How this braking arrangement effects the forces in the system will be explained in an example. Assuming that, corresponding to the wrap-around angle $\alpha$, the ratio between the holding force and the pull-out force is 1:8, at a double roller arrangement, one obtains a total force transfer of 1:64. Using the lower number 1:60, if the belt system is under a load of, for example 1800 kp, the holding force at the automatic roll-up device is reduced to one sixtieth, i.e. to 30 kp. Therefore it is also possible, by this system, to construct the automatic roll-up device lighter and less costly.

To obtain a possibly highest friction value between roller and belt, it is advantageous to provide an elastic surface layer on the roller 7 in the region of the belt width. By this provision, the belt also does not show wear in normal operation. Such design of the roller 7 is indicated in FIG. 8, wherein a tubular sleeve 23 is provided with locking teeth 24 in the end zones of roller 7. Between the locking teeth 24, the sleeve 23 of the roller 7 is provided with a suitable, non-skid elastic layer 25. A filler piece 26 serves also as the bearing for the roller 7, which is freely rotatable on the support shaft 27. In this embodiment, the roller 7 is supported between two walls 28 of, for example, a U-shaped bracket 29, whose walls contain elongated support cut-outs 30 for the support shaft 27. The roller 7 is kept in the rest position by the springs 10.

In the embodiment discussed so far, except the embodiment according to FIG. 8, the braking and arresting of the roller 7 is effected by friction with the braking-surfaces 12 after overcoming the activating threshold. The braking surfaces represent a counter thrust-block for the roller 7.

In contrast to this, the arresting of the roller 7, according to FIG. 8, and the roller 7 according to the FIGS. 6 and 7, is effected by positive locking, i.e. by engagement of locking teeth in a corresponding counter-teeth arrangement. This counter-teeth arrangement in FIG. 8, and also in FIGS. 6 and 7, are designated by numeral 31, and has the shape of a circular segment. The locking teeth 24 are located at both ends of the roller 7 and between them is the running surface for the belt 4. In FIG. 6 and FIG. 7, the roller 7 is supported on a two-armed, U-shaped rocking arm 32, which is hingeably supported on the rotation axis 33 on a lug 34 of the bracket. Rocking arm 32 is tensioned by a spring 10 and holds the rocker arm 32 in the rest position when not activated. When the activating-threshold is exceeded, the locking teeth 24 fall into the counter-teeth arrangement 31, by the tilting of the rocker arm 32 thus effecting the arresting of the roller 7. In the embodiment according to FIGS. 6 and 7, the belt braking device is an integral part of an automatic belt roll-up device, especially as shown in FIG. 7, whereby the roller 7 is arranged opposite the belt roll-off side of the automatic roll-up device.

Instead of the locking teeth and counter-teeth, the roller 7 can also be provided with wedge-shaped grooves 35, or circular wedge-shaped bars not shown, according to the embodiments shown in the FIGS. 9 and 9a, into which corresponding counter wedge 36 falls, after exceeding the activating threshold, and thereby brakes and arrests the roller 7, similar to the previously described examples. In the typical embodiments according to the FIGS. 10, 11 and 12 the rotation axis or the support shaft 37 of roller 7 is stationary, but freely rotatably supported in the bracket 38. While the roller 7 maintains its position in the case of activation, the arresting of the roller 7 is achieved by locking means with a swing-like motion, i.e. by positive locking or by locking by friction.

Figure 10:
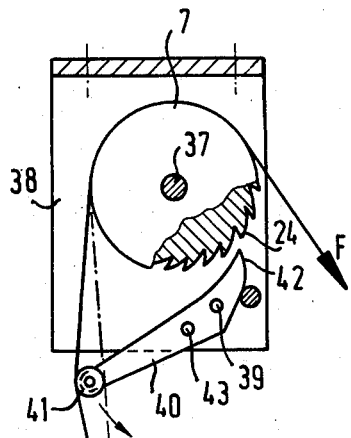
FIGS. 10, 11 and 12 illustrate three different embodiments having a stationary roller supported in a fitting or housing, with different types of locking means arranged at the outside.
Figure 11:
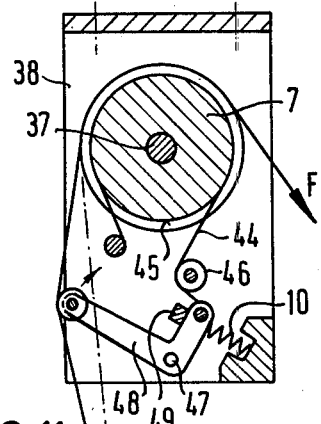

According to FIG. 10, the locking means is a two-armed locking pawl 40 which is pivoted at 39 on the bracket 38. The pawl has, at one end, a roller 41 in contact with the belt, and at the other end, a pawl tooth 42, which engages in the locking teeth 24 of the roller 7 after a rotation over a short path in the direction of the arrow. A shear pin 43 connects the locking pawl 40 with the bracket 38. Shear pin 43 shears off at a predetermined pulling force F at the belt 4, i.e. when reaching the activating threshold, and thereby makes it possible that the shown belt portion moves the locking pawl 40 into the lock position, when the belt 4 reaches the position shown by the dash-dot line. The arrangement according to FIG. 11 is basically similar to the one in FIG. 10, only here a belt-brake 44 is used as the arresting means. Belt-brake 44 is fastened at one side to the bracket 38, and wraps around the greater part of roller 7, for example, at a peripheral surface 45. Belt-brake 44 at the other side is guided over deflection roller 46 and then fastened to the arm of a lever 48 rotatably supported at 47. Lever 48 is pressed by a spring 10 against a stop 49 in its rest position. The spring is dimensioned to correspond to a predetermined threshold force.

Figure 12:
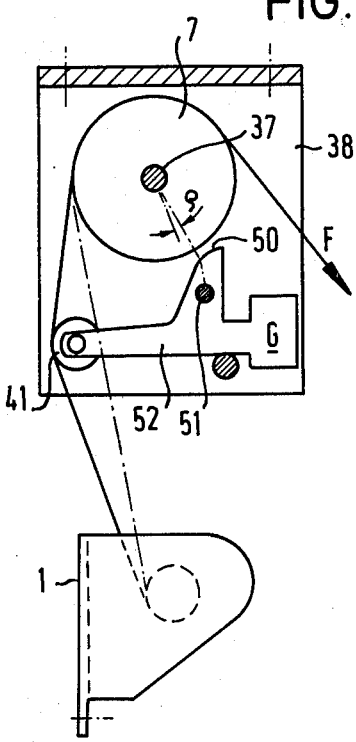

Also in the embodiment according to FIG. 12, the previously mentioned basic principle is used. Here the locking means are made in the form of a two-armed lever 52, which is rotatably supported at 51. Lever 52 has a clamp-lock with a clamping surface 50 on one side, and a roller 41 at the other side. A weight G, serving as activating threshold, and as a counterweight, keeps the lever 52 in the normal-rest position.

The embodiments according to FIGS. 10, 11 and 12 all have locking means which are arranged at the outside. By kinematic reversal, obviously an arresting of the roller 7 can also be effected by locking or clamping elements, which engage from the inside, not further illustrated in the drawings.

Figure 13:
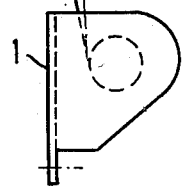
FIG. 13 shows, in greater detail, a tooth-lock, of FIG. 6, with particular reference to indicate the forces acting therein.
Figure 14:
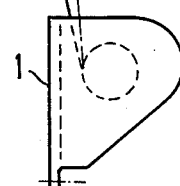
FIG. 14 is a further detail of a tooth-lock of FIG. 2 with indication of the forces working therein.

FIGS. 13 and 14 are shown which forces act on the roller 7 in the locking or clamping system, and which forces are effective in the whole system. Because, due to the belt braking effect, different forces act on the periphery of roller 7, it is important that in engaged or clamp position, no moments affect the roller 7 which can move the roller 7 out of this engaged or clamping position. If one chooses the engagement or clamping diameter smaller than the roll-off diameter of the belt 4 at the roller 7, the forces are distributed as shown in FIG. 13. Since the pulling force F is greater than the holding force S, the roller 7 will rotate around the pulling point K, unless suitable counter-measures are taken. In this case, the roller 7 is supported in a rocker arm 32 (compare FIG. 6), thereby preventing the roller 7 from moving out of the clamped or engaged position when a load is applied. The corresponding lever arms of the effective forces are disignated with a and b.

In the simplified drawing according to FIG. 14, the engagement or clamping diameter of the locking teeth 24 is made larger than the roll-off diameter at the roller 7 around which the belt is wrapped. Thereby the pull-point K lies outside of the wrap-around zone of the belt, thus effecting a stable position for the roller 7 at any load condition, and no turning moments exist capable of moving the roller 7 out of its arresting position. Therefore, in this arrangement, no rocking arm is required. In this case the roller 7 can be guided and supported in longitudinal slots, for example, whereby no forces, except guide-forces, act in the slot. A braking device for a belt can be very economically and cheaply manufactured by this design.

Figure 15:
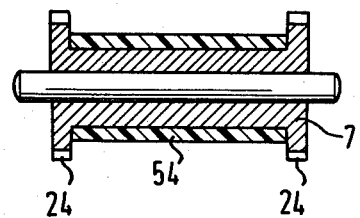
FIG. 15 shows a brake roller in section in which the running surface of the roller is an elastic non-skid cover.
Figure 16:
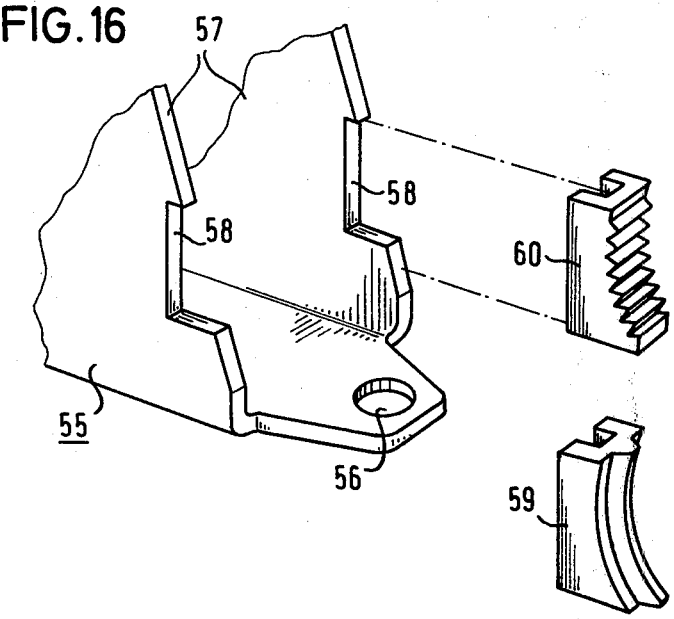
FIG. 16 shows part of a bracket or a housing for a belt-braking device according to FIGS. 13 to 15, with the counter supports shown in an exploded view.

In FIG. 15, such a roller 7 is shown in section, whereby the running surface of the roller 7 is formed by an elastic, non-skid cover 54. FIG. 16 shows an embodiment of a belt braking device comprising an essentially U-shaped bracket 55, with a mounting hole 56 in the connecting leg. Notches 58 are provided in the side walls 57 into which segment-shaped braking or locking shoes 59, respectively, 60 can be rigidly attached. Such added parts can be very simply produced as sintered or die-cast elements, and serve as counter supports for a roller 7 which for example, is provided at its ends with corresponding wedged-grooves (35, FIG. 9), or with locking teeth 24. A special advantage is that the bracket 55 need not have a precision shape and accuracy in the engagement region, and thus can be manufactured as a normal stamped part.

Within the scope of the invention lies the idea that in all the described embodiments in which the activating threshold is determined by a counter weight, or by spring force, at a sudden pullout of the belt, the belt brake is moved to its braking- or arresting position also without locking the normal locking system, which means a further increased safety factor in the belt system.

There are claimed:

1. Belt-braking system for safety belts, especially for motor vehicles, which comprises an automatic roll-up device having a roll-up roller on which a safety belt is wound and which is normally unwound by pulling the belt against the force of a spring, said roll-up device having a locking device which is activated to lock the roll-up roller when the vehicle accelerates or decelerates beyond a predetermined rate, a belt-brake having a rotatably supported brake roller which is partly wrapped around by said belt from said automatic roll-up device, friction or positive locking means to arrest said brake roller, and activating means activated by the belt pull when it exceeds a predetermined force, to cause said locking means to arrest said roller whereby said belt is braked by the surface of said roller around which said belt is partly wrapped when the brake roller rotation is arrested.

2. Belt-braking system according to claim 1, wherein a friction pairing between the running surface of said roller and the belt band corresponding to the wrap-around angle (α) is provided which results in self-locking when the roller is arrested.

3. Belt-braking system according to claim 1, wherein at least one counter support is disposed a short distance from said brake roller at its end regions, and wherein said brake roller is movable relative to said counter support, and the brake is prevented from continuing its rotation by contact of its end-regions with said counter support by friction or positive locking.

4. Belt-braking system according to claim 3, wherein the end portions of said brake roller are provided with locking teeth.

5. Belt-braking system according to claim 3, wherein the end regions of said brake roller are formed as wedge-shaped grooves and wherein said counter support includes a corresponding counter-wedge disposed adjacent each said groove.

6. Belt-braking system according to claim 1, wherein said brake roller has an outer tubular sleeve and has an elastic layer affixed thereto.

7. Belt-braking system according to claim 1, wherein the rolling surface of said brake roller is roughened.

8. Belt-braking system according to claim 3, wherein said end regions of said brake roller which engage to arrest said brake roller have a diameter not greater than the belt roll-off diameter of the brake roller.

9. Belt-braking system according to claim 3, wherein said end regions of said brake roller which engage to arrest said brake roller, have diameter greater than the belt roll-off diameter of the brake roller.

10. Belt-braking system according to claim 3, wherein said brake roller is rotatably supported in a rocker arm, and wherein spring means connected to the rocker arm retain the brake roller in the rocker arm a short distance from said counter support during normal operation.

11. Belt-braking system according to claim 3, wherein said brake roller is disposed in a bracket having two parallel walls with elongated perforations and said brake roller is rotatably supported between said walls and guided in the perforations, and said roller is movable relative to the counter support.

12. Belt-braking system according to claim 3, wherein said brake roller is supported by bracket means, and wherein said bracket means includes a member with U-shaped legs, with at least one said counter support attached to one said U-shaped leg.

13. Belt-braking system according to claim 1, wherein said brake roller is supported by an axis shaft which is secured in a bracket, and wherein said locking means to arrest said brake is a lever which when activated by said belt pull moves in contact with an end region of said brake roller.

14. Belt-braking system according to claim 1, wherein said brake is supported by an axis shaft which is secured in a bracket, and wherein said locking means to arrest said brake roller is a band brake about an end region of said brake roller, said brake band connected to and tightened by a lever when activated by said belt pull.

15. Belt-braking system according to claim 1, wherein said brake roller is supported by an axis shaft which is secured in a bracket, and wherein said locking means to arrest said brake are locking teeth disposed in end regions of said brake roller and roller locking pawls which when activated by said belt pull engage said locking teeth.

16. Belt-braking system according to claim 1, wherein said brake roller is arranged adjacent the belt pull-off of said automatic roll-up device, and said brake roller is attached to said automatic roll-up device as an integral part thereof.

17. Belt-braking system according to claim 1, wherein said brake roller is not attached to said automatic roll-up device, and wherein said roller is spatially separated from the automatic roll-up device.

18. Belt-braking system according to claim 1 or claim 3 or claim 10, wherein two brake rollers are together rotatably supported on a hingeable rocking arm, which pivots at a point between said two brake rollers.

19. Belt-braking system according to claim 1, wherein said predetermined force is a spring force by use of a spring.

20. Belt-braking system according to claim 1, wherein said predetermined force is a shearing force by use of a shear pin.

21. Belt-braking system according to claim 1, wherein said predetermined force is a weight force by use of a counter-weight.

22. Belt-braking system according to claim 12, wherein said counter support is a separate part as an insert in the form of a segment-shaped brake- or engagement shoe fitted to said bracket means.

23. Belt-braking system according to claim 19, wherein said spring is set so that, at a sudden belt pull-out which exceeds said predetermined force, the brake roller is arrested while said locking device is not activated.

24. Belt-braking system according to claim 19, wherein said counter-weight is set so that, at a sudden belt pull-out which exceeds said predetermined force, the brake roller is arrested while said locking device is not activated.

25. Belt-braking system according to claim 23 or claim 24, wherein said predetermined force is so set that the activation of the belt brake is effected independently of the locking of the belt in said automatic roll-up device.

* * * * *